United States Patent
Kazmierczak et al.

(10) Patent No.: US 6,639,749 B1
(45) Date of Patent: Oct. 28, 2003

(54) SUPPLYING POWER FROM A SPINDLE MOTOR IN A DISC DRIVE SYSTEM

(75) Inventors: Frederick F. Kazmierczak, Erie, CO (US); T. Jay Cameron, Corralitos, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/429,393

(22) Filed: Oct. 28, 1999

Related U.S. Application Data (60) Provisional application No. 60/116,578, filed on Jan. 21, 1999.

(51) Int. Cl.[7] ............................................... G11B 21/02
(52) U.S. Cl. ............................................................. 360/75
(58) Field of Search ................................. 360/75, 78.12, 360/266.4, 264.8, 264.9; 310/12–14, 22

(56) References Cited

U.S. PATENT DOCUMENTS

| | | |
|---|---|---|
| 3,473,099 A | 10/1969 | Miller |
| 3,626,264 A | 12/1971 | Halfhill et al. |
| 3,629,679 A | 12/1971 | Halfhill et al. |
| 4,202,020 A | 5/1980 | Lovgren et al. |
| 4,237,501 A | 12/1980 | Barmache et al. |
| 4,275,343 A | 6/1981 | Fulton et al. |
| 4,371,818 A | 2/1983 | Lewis |
| 4,371,903 A | 2/1983 | Lewis |
| 4,679,102 A | 7/1987 | Wevers et al. |
| 4,831,469 A * | 5/1989 | Hanson et al. ............... 360/75 |
| 5,034,837 A * | 7/1991 | Schmitz ....................... 360/105 |
| 5,260,618 A * | 11/1993 | Dunfield ....................... 310/154 |
| 5,267,110 A * | 11/1993 | Ottesen et al. ............. 360/78.12 |
| 5,384,524 A | 1/1995 | Romano |
| 5,473,238 A | 12/1995 | Latham, II et al. |
| 5,486,957 A | 1/1996 | Albrecht |
| 5,504,402 A | 4/1996 | Menegoli |
| 5,557,152 A * | 9/1996 | Gauthier ....................... 310/46 |
| 5,654,848 A | 8/1997 | Maiers et al. |
| 5,663,846 A * | 9/1997 | Masuoka et al. ............... 360/75 |
| 5,675,230 A | 10/1997 | Dunfield |
| 5,729,399 A | 3/1998 | Albrecht et al. |
| 5,737,144 A * | 4/1998 | Ataee et al. ................... 360/75 |
| 5,754,369 A | 5/1998 | Balakrishnan |
| 5,969,899 A * | 10/1999 | Utenick et al. ............ 360/78.04 |
| 6,081,400 A * | 6/2000 | Lu et al. ........................ 360/75 |
| 6,140,784 A * | 10/2000 | Mazda .......................... 318/280 |
| 6,353,510 B2 * | 3/2002 | Drouin .......................... 360/75 |

FOREIGN PATENT DOCUMENTS

| | | |
|---|---|---|
| GB | 1259926 | 1/1972 |
| GB | 2 121 589 A | 12/1983 |
| JP | 54075018 | 6/1979 |
| JP | 58045670 | 3/1983 |

\* cited by examiner

*Primary Examiner*—David Hudspeth
*Assistant Examiner*—K. Wong
(74) *Attorney, Agent, or Firm*—Merchant & Gould P.C.

(57) ABSTRACT

A system and method for unloading a transducer assembly to a ramp positioned outside an outer diameter of a disc in a disc drive system directs current generated from the back EMF (electromotive force) of a spindle motor to supplement current provided by a power supply to a positioning coil. The combined current yields increased torque to park the transducer assembly without requiring unnecessary power consumption during normal disc drive operation. The current generated from the back EMF of the spindle motor is enhanced by accelerating the rotation of the spindle motor to exceed the normal operational rotational velocity of the disc drive system. A position detector provides a trigger signal to control the timing of the switch that combines the current from the back EMF and the current from the power supply to the positioning coil. A modified voice coil motor configuration optimizes the magnetic flux density along the length of the voice coil motor magnets so as minimize unnecessary power consumption while optimizing the magnetic flux density in the region corresponding to the disc surface.

13 Claims, 10 Drawing Sheets

SUPPLYING POWER FROM A SPINDLE MOTOR IN A DISC DRIVE SYSTEM

The present application claims the benefit of U.S. Provisional Application No. 60/116,578 entitled "USE OF A SPINDLE MOTOR AS POWER SUPPLY", filed Jan. 21, 1999.

FIELD OF THE INVENTION

The present invention relates generally to the field of disc drive storage devices, and more particularly, but not by way of limitation, to supplying power from a spindle motor in a disc drive system.

BACKGROUND OF THE INVENTION

Modern hard disc drives comprise one or more rigid discs that are coated with a magnetizable medium and mounted on the hub of a spindle motor for rotation at a high speed. Information is read from and written to each disc in a plurality of concentric tracks by a transducer assembly mounted on an actuator arm. The outside circumference of each disc is referred to as the "outer diameter" (OD), and the center of each disc is referred to as the "inner diameter" (ID). A transducer assembly is said to "fly" over the disc surface as the disc rotates. When disc rotation velocity decreases, the layer of air supporting the transducer assembly above the disc surface diminishes and the assembly descends toward the disc surface. However, contact between the transducer assembly and the disc surface can damage the magnetizable medium and the transducer assembly. Furthermore, through a phenomenon called "stiction," a transducer assembly can become temporarily "stuck" to the disc surface after contact with the disc surface. Stiction can damage the magnetizable medium, the transducer assembly, and/or the actuator arm when the disc drive system initiates disc rotation in an attempt to move the transducer assembly from the disc surface.

One approach to addressing this problem is to land the transducer assembly in a textured landing zone, preferably near the ID of the disc. Typically, data is not recorded in the landing zone, and the texturing of the landing zone surface minimizes stiction. The actuator arm is moved to an ID landing zone from the disc when the rotational velocity of the disc is decreased, thereby avoiding contact with the data area of the disc. The transducer assembly is moved back to the disc when the rotational velocity increases to allow it to fly above the disc surface.

An alternative approach for loading/unloading a transducer assembly is to move the actuator arm onto a ramp, preferably positioned outside the OD of the disc. The ramp supports the transducer assembly outside the diameter of the disc and prevents contact between the transducer assembly and the disc surface. An actuator arm typically sweeps a 25° arc from ID to OD to access tracks on a disc; however, the ramp feature can increase the total sweep (i.e., stroke) required of the actuator arm and a voice coil motor (VCM) to approximately 50°. Furthermore, the ramp presents additional resistance to the movement of the actuator arm, because the arm must ascend the sloped surface of the ramp, which also introduces an additional friction component.

Figure 1:
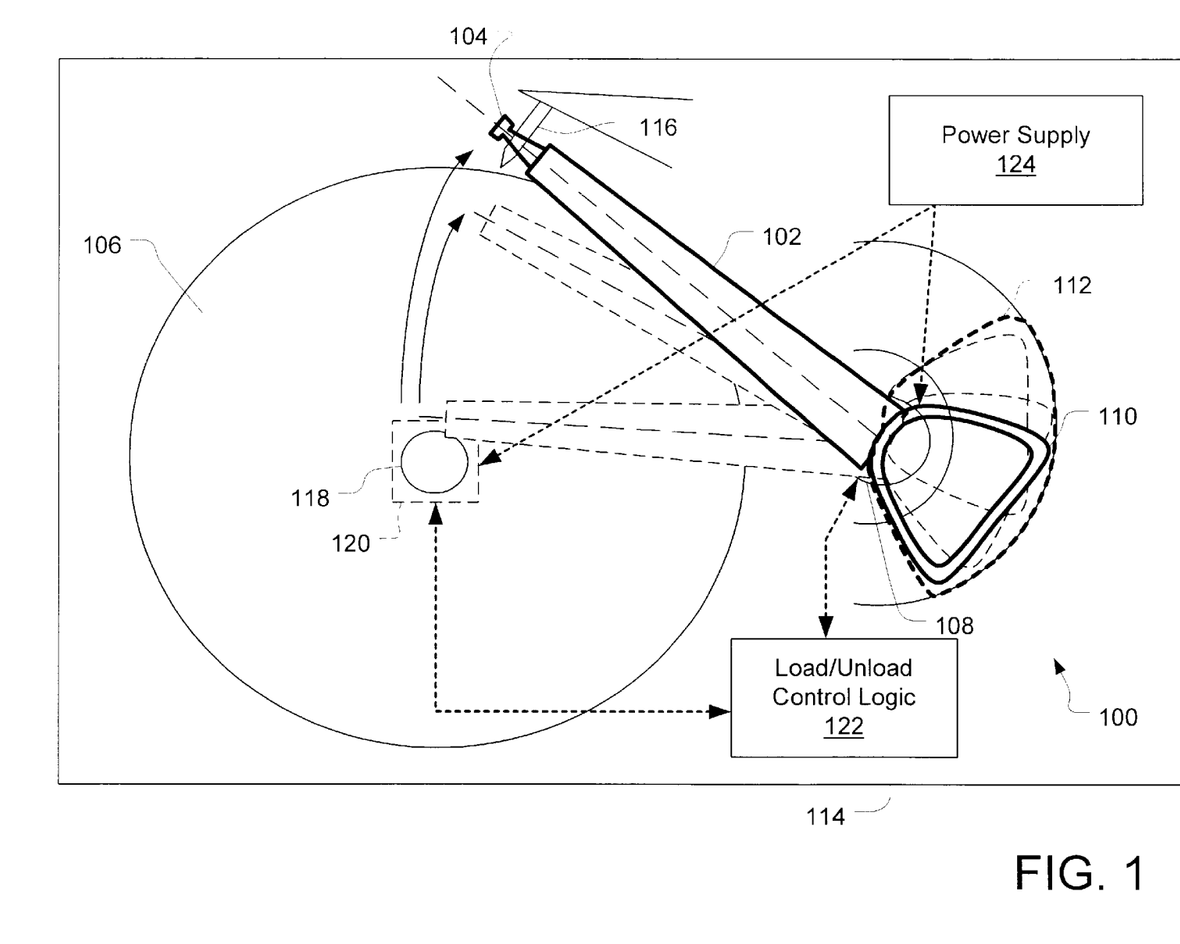
FIG. 1 is a simplified schematic representation of a disc drive system incorporating load/unload control logic in an embodiment of the present invention.

A rotary VCM actuator, shown generally at 100 in FIG. 1, commonly provides the motive force to move the actuator arm 102, and therefore the transducer assembly 104, across the disc from ID to OD. The actuator arm 102 is cantilevered outward over the disc surface 106 from a common pivot structure 108, while the coil 110 of the VCM 100 extends horizontally outward from the other side of the pivot structure. A permanent magnet and pole piece structure 112 is fixedly mounted to the housing 114 of the disc drive in such an arrangement that the coil 110 is movably supported in the middle of the magnetic field formed by the stationary magnet of the structure 112.

Sophisticated control logic uses a servo algorithm to apply carefully calculated amounts and polarities of DC (direct current) power to the ends of the coil 110 for controllably moving the coil 110 within the magnetic field, thereby moving the actuator arm 102 across the disc surface 106. As the coil 110 moves between the horizontal extremes of the stationary magnet in structure 112, the actuator arm 102 moves across the disc surface 106 approximately between the ID and the OD. As such, the length of the stationary magnet structure 112 corresponds proportionally to the arcuate sweep of the actuator arm 102.

In disc drive designs employing storage of the transducer assembly 104 outside of the OD, the length of the stationary magnet structure 112 is commonly increased to accommodate the increased sweep of the actuator arm. At the horizontal extremes of the stationary magnet structure 112, the torque generated by the VCM is weaker than toward the horizontal interior of the VCM because the flux density is diminished. Applied torque is proportional to both flux density and current in the coil 110. Accordingly, the torque applied to the actuator arm 102 by a particular DC current (i.e., as controlled by a particular servo algorithm) is diminished near the extremes of the actuator arm's sweep. In disc drive designs employing ramped storage of the actuator arm 102 outside of the OD, the diminished torque presents a difficulty moving the actuator arm 102 onto a ramp 116. Even in the circumstance of a control power-down operation, the diminished torque outside the OD impacts the unloading of the transducer assembly to a ramp by requiring additional current from the power supply and/or changes in the servo algorithm.

The diminished torque may be addressed by increasing the length of the stationary magnets in structure 112 to extend the magnetic field at the outer extreme of the sweep. However, merely increasing the length of the magnets increases the cost and size of the components. Increasing the magnet length also decreases the flux density distributed between the poles. Therefore, to apply the same torque to the actuator arm 102 during normal operation, additional current must be supplied to the actuator coil 110, unnecessarily increasing the normal power consumption of the disc drive system. The problem is how to provide adequate torque to the actuator arm 102 when it is needed to ascend the ramp 116 outside the OD of a disc surface 106 during a retract operation without unnecessarily increasing the cost, size, and, the overall power consumption of the disc drive system during normal operation.

SUMMARY OF THE INVENTION

Embodiments of the present invention provide a method and system for unloading a transducer assembly to a ramp positioned outside an outer diameter of a disc in a disc drive system using supplementary power from back EMF generated by a spindle motor rotating from a velocity that exceeds the normal operating velocity.

In accordance with the preferred embodiment, a method for unloading a transducer assembly to a ramp positioned outside an outer diameter of a disc in a disc drive system including a spindle motor for rotating the disc and a positioning coil coupled to a power supply for moving the transducer assembly relative to the disc is provided. The disc is rotated at a first rotational velocity equaling a normal operational rotational velocity of the disc drive system. A retract signal is received. The rotation of the disc is accelerated to a second rotational velocity that exceeds the normal operational rotational velocity of the disc drive system, responsive to the retract signal. Power is decoupled from to the spindle motor. The positioning coil is energized with output from the power supply to retract the transducer assembly to the ramp, responsive to the retract signal. The positioning coil is also energized with back voltage generated from the spindle motor to retract the transducer assembly to the ramp.

In accordance with the present invention, a disc drive system for unloading a transducer assembly from a disc is provided. A spindle motor rotates the disc at a first rotational velocity being a normal operational velocity of the disc drive system. A spindle motor control module removes power provided to the spindle motor. A positioning coil coupled to a power supply moves the transducer assembly relative to the disc. A back voltage switching module diverts back voltage generated from the spindle motor to supplement the power provided to the positioning coil by the power supply, responsive to a retract signal. A ramp is positioned outside the outer diameter of the disc to which the positioning coil unloads the transducer assembly when powered by the power supply and the back voltage.

These and various other features as well as advantages which characterize the present invention will be apparent from a reading of the following detailed description and a review of the associated drawings.

DETAILED DESCRIPTION

FIG. 1 is a simplified schematic representation of a disc drive system incorporating load/unload control logic 122 in an embodiment of the present invention. The disc drive system includes a housing 114 that serves to maintain the clean air environment inside the disc drive system. A plurality of discs is mounted for rotation on a spindle 118, which is rotated by a spindle motor 120. The VCM 100 is driven by electronic circuitry to controllably move the transducer assembly 104 to any desired one of a plurality of concentric circular tracks on the disc surface 106 along an arcuate path. The spindle motor 120 and the coil 110 of the VCM 100 are coupled to a power supply 124. By supplying current.to the spindle motor 120, the spindle (and therefore the discs) can be rotated to a variety of velocities. By supplying current to the coil 110, the actuator arm 102 and the transducer assembly 104 moves relative to the disc surface 106.

Responsive to a retract signal, the transducer assembly is retracted from the disc's surface and parked upon a ramp 116. In an embodiment of the present invention, the spindle motor accelerates the rotational velocity of the spindle motor (and therefore the discs) to exceed the normal operational rotational velocity of the disc drive system. By decoupling the power supply from a spinning spindle motor and then coupling the windings in the spindle motor to the VCM, the back EMF (electromotive force) generated by the spindle motor 120 as it spins down may be captured and applied to the coil 110 of the VCM 100. In an embodiment of the present invention, when power is removed from the spindle motor 120, the stored energy of the rotating spindle motor 120 is used as a supplemental source of electrical power to the VCM 100. Furthermore, as a result of the accelerated rotation of the discs, the back EMF generated by the spindle motor 120 is increased relative to the back EMF that could be generated from the normal operational rotational velocity. A switching module in the load/unload control logic 122 combines current generated from the back EMF with the power supply current and directs the combined current to the coil 110. The combined current causes the VCM 100 to yield additional torque to retract the transducer assembly 104 to the OD and up the ramp 116.

Figure 2:
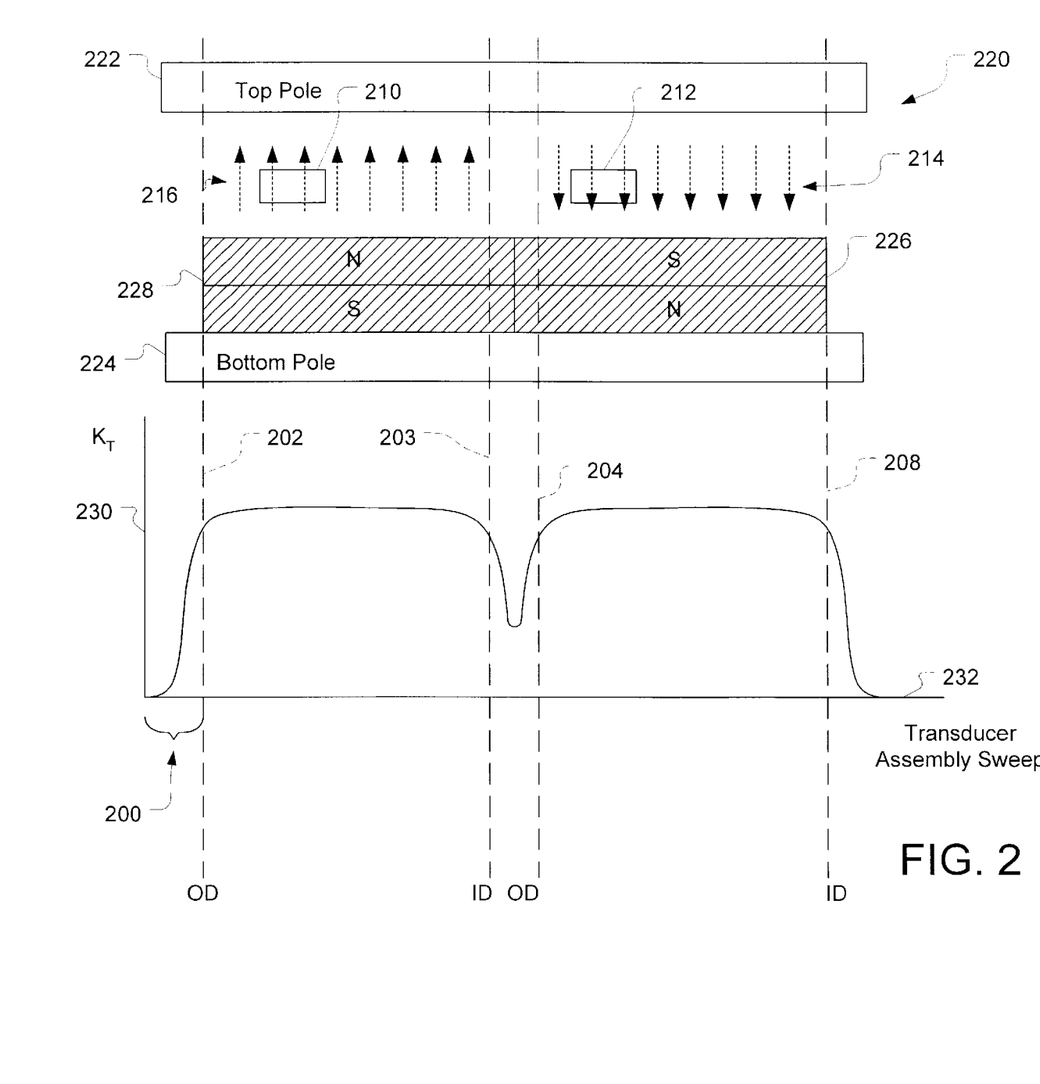
FIG. 2 depicts a graph of a torque constant $K_T$ versus the actuator arm sweep in a disc drive system.

FIG. 2 depicts a graph of a torque constant $K_T$ versus the transducer assembly sweep in a disc drive system. Structure 220 represents a portion of a VCM comprised of a top pole 222, a bottom pole 224, a right magnet 226, a left magnet 228, and coil arms 210 and 212. The coil 30 arms are elements of a voice coil coupled to an actuator arm (see actuator arm 102 and coil 110 in FIG. 1). The current in one coil arm 210 preferably flows in the opposite direction as the current in the other coil arm 212. The arrows 214 and 216 indicate the direction of magnetic flux generated by magnets 226 and 228 and conducted by bottom pole 224 and top pole 222. When current is applied to coils 210 and 212, they are moved left or right in accordance with the well-known Lorenz relationship. As the coil arms 210 and 212 move relative to magnets 228 and 226 respectively, the transducer arm moves across the disc surface between the ID and OD. This relationship is indicated by dotted lines 202, 203, 204 and 208, which represent the corresponding positions of the transducer assembly relative to the position of the coils within the VCM.

Generally, the torque (T) applied to an actuator arm by the VCM is characterized by $T=K_T*I$, where $K_T$ is the torque constant shown as axis 230 and I is the current through the coil. The torque constant equals the magnetic flux density (B) times the length of the wire in the coil (i.e., $K_T=B*L_{wire}$). The horizontal extremes of the magnets inversely correspond to the extremes of the transducer assembly sweep (i.e., to ID and OD or to ID and the position of the ramp).

At the extremes of the stationary magnets, the magnetic flux density B decreases as the magnetic field lines spread out; thus, $K_T$ also decreased at the extremes of the stationary magnets as shown in FIG. 2. For a particular current I, this characteristic of $K_T$ results in diminished torque T on the actuator arm at the extremes of the sweep of the actuator arm, particularly in the region between the OD and the ramp (as indicated at region 200). Accordingly, a graph of torque T versus the actuator arm sweep would be directly proportional to the $K_T$ graph of FIG. 2 for a consistent current I.

The decrease in $K_T$ at the extremes of the stationary magnets, which approximately correspond to the extremes of the transducer assembly sweep, can be compensated by tuning the torque constant $K_T$ and the current I through the coil for certain sweep angles (shown by the transducer sweep axis 232) because the torque T is also linearly proportional to the current I. If $K_T$ is non-zero in the region shown generally at 200, increasing the current when the actuator arm is between the OD and the ramp will increase the amount of torque generated in that region.

Figure 3:
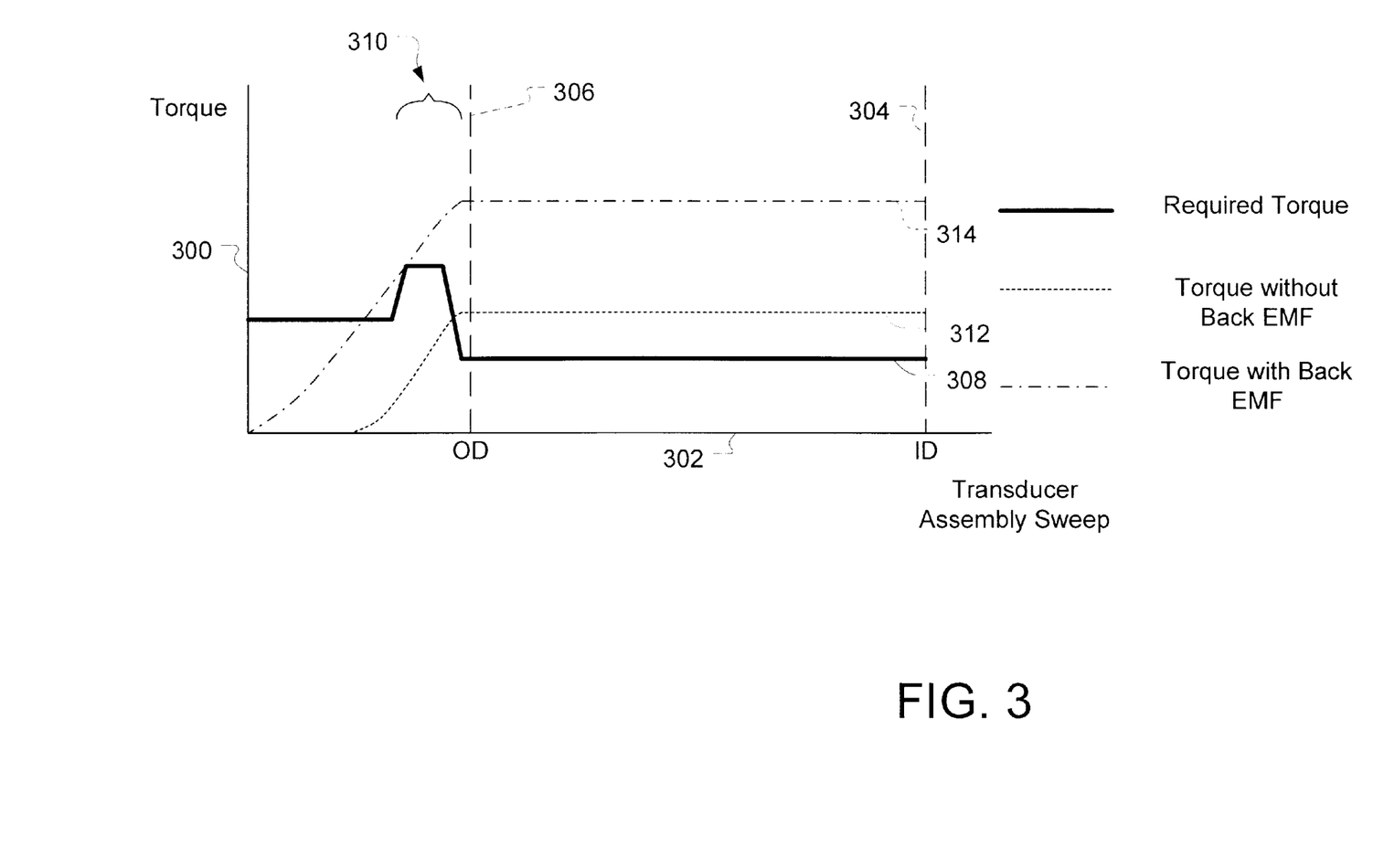
FIG. 3 depicts a graph of required and generated torque versus the actuator arm sweep in a disc drive system.

FIG. 3 depicts a graph of required and generated torque versus the actuator arm sweep in a disc drive system. An axis 300 represents the torque required or generated to move the transducer assembly relative to the disc surface. An axis 302 indicates the sweep of the transducer assembly relative to the disc surface. For example, dotted line 304 represents the position of the transducer assembly at the ID of the disc. Likewise, dotted line 306 represents the position of a transducer assembly at the OD of the disc. It should be understood that the position of the transducer assembly indicated by the region to the left of the dotted line 306 corresponds to a retract position ascending or on a ramp.

A solid bold line 308 represents the torque required to move the transducer assembly relative to the disc surface. The elevated region 310 of the required torque corresponds to the increased torque required to move the transducer assembly up the parking ramp. That is, the ramp introduces increased resistance to the movement of the transducer assembly, therefore additional torque is required to ascend the ramp.

The single dotted line represents the torque generated by the servo algorithm in a disc drive system, which does not supplement the current to the VCM with current generated from back EMF of the spindle motor. For example, a servo algorithm, typically based on 5 volt or 3.3 volt power supplied to the VCM, controls the movement of the transducer assembly. However, on the ramp, the transducer assembly is presented with additional resistance from the ramp, and in this region, the servo algorithm used to move the transducer assembly between ID and OD under power from the power supply only is inadequate to surmount the ramp. Furthermore, when the $K_T$ degrades outside the OD, the torque deficit compounded amplified in that region. Without supplemental current from another power source, increased output capability from the power supply and/or modifications to the servo algorithm are necessary to provide the required torque to retract the transducer assembly up the ramp.

The dashed-dotted line 314 represents the torque generated to move the transducer assembly relative to the surface of the disc when the power supply current is supplemented with current from the back EMF of a spindle motor. The same servo algorithm and 5 volt or 3.3 volt power supply can be used to move the transducer assembly from ID to OD as was used with line 312. However, with the addition of current generated from the back EMF of the spindle motor, the resulting torque increases proportionally with the increased current. Therefore, the torque applied to the actuator arm to move the transducer assembly relative to the disc surface is dramatically increased so that the additional current supplied to the VCM provides adequate torque, even in the region of diminished $K_T$ and increased required torque in region 310, to fully retract the transducer assembly up the ramp.

Figure 4:
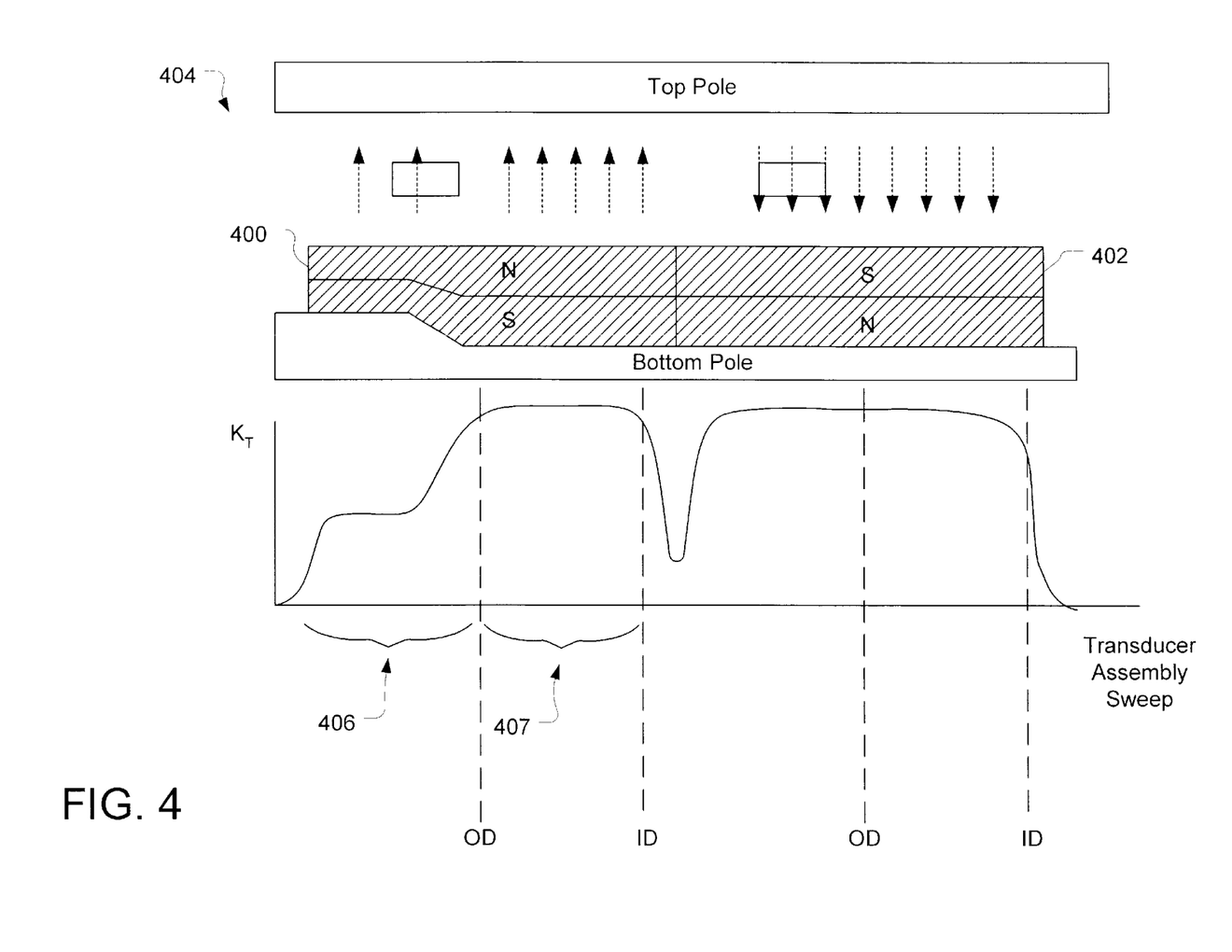
FIG. 4 depicts a VCM configured to provide a tuned torque constant $K_T$ in an embodiment of the present invention.

FIG. 4 depicts a VCM configured to provide a tuned torque constant $K_T$ in an embodiment of the present invention. As discussed, generated torque is linearly proportional to both $K_T$ and supplied current I. However, if the actuator coils move to a region of zero (or near zero) $K_T$, no torque (or insufficient torque) will be applied to the actuator arm. In an embodiment of the present invention, the length of the stationary magnets 400 and 402 are extended to provide torque outside the OD of the disc. However, merely extending the length of the magnets decreases the flux density throughout the VCM. Decreased flux density requires increased current to the coil to achieve the desired torque (which corresponds to disc drive access time) during normal operation.

To minimize the need for additional current during normal operation, the VCM 404 can be modified in one or more regions corresponding to the ramp region. For example, in the ramp region 406, the magnet 400 has been thinned. As a result, the flux density in region 406 decreases relative to the region 407 between ID and OD, as does the $K_T$ as shown in the corresponding graph below the VCM in FIG. 4. Nevertheless, the flux density remains constant over the region between ID and OD where normal operation occurs and where consistent speed control is required. During the retract operation, fine speed control is somewhat less important. Therefore, by supplementing the normal VCM coil current with back EMF-generated current, the necessary torque is provided to move the transducer assembly past the OD and up the ramp, even in light of the diminished (but non-zero) $K_T$ in region 406.

In a preferred embodiment, the $K_T$ corresponding to the disc surface between ID and OD is approximately 0.14 inch-pounds per ampere. The current provided by the power supply to the coil is approximately 0.400 amperes. A desired velocity of the transducer assembly during retract is approximately 10 inches per second. The normal operation (i.e., rotational) velocity of the spindle motor is approximately 4500 revolutions per minute. The accelerated rotational velocity responsive to a retract signal is approximately 6750 revolutions per minute. The supplemental current generated from the back EMF of the spindle motor and combined with the current from the coil power supply is approximately 0.200–0.400 amperes. The thickness of the magnets corresponding to the disc surface between ID and OD is approximately 0.060 inches, resulting in a flux density of approximately 4500 Gauss in the gap. In the modified VCM configuration, the thickness of the magnets corresponding to the region outside the OD is approximately 0.030 inches, resulting in a flux density of approximately 2500 Gauss in this region. While these parameters correspond to one embodiment of the present invention, other parameters may be employed without departing from the present invention so as to provide the requisite supplemental current to the positioning coil.

Figure 5:
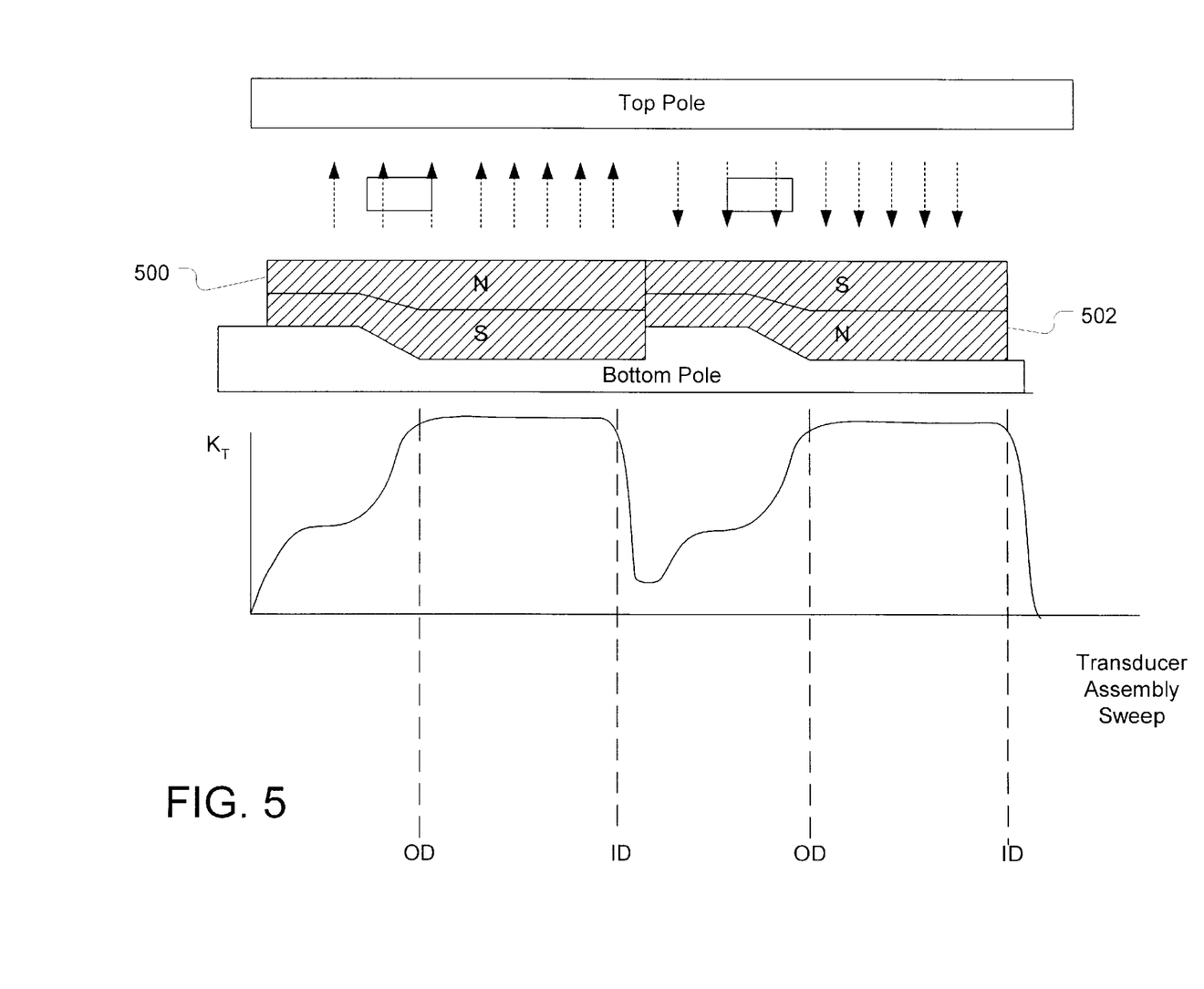
FIG. 5 depicts an alternative embodiment of a VCM configured to provide a tuned torque constant $K_T$.

FIG. 5 depicts an alternative embodiment of a VCM configured to provide a tuned torque constant $K_T$. In this configuration, both of the magnets 500 and 502 are thinned in regions corresponding to the ramp region of the disc drive system. Accordingly, the magnetic flux densities in both of the thin magnet regions are diminished (but non-zero) relative to the regions corresponding to the disc surface between ID and OD. This configuration further optimizes the distribution of the flux density across the increased length of the magnets, and therefore, optimizes power requirements to the coil during normal operation.

Figure 6:
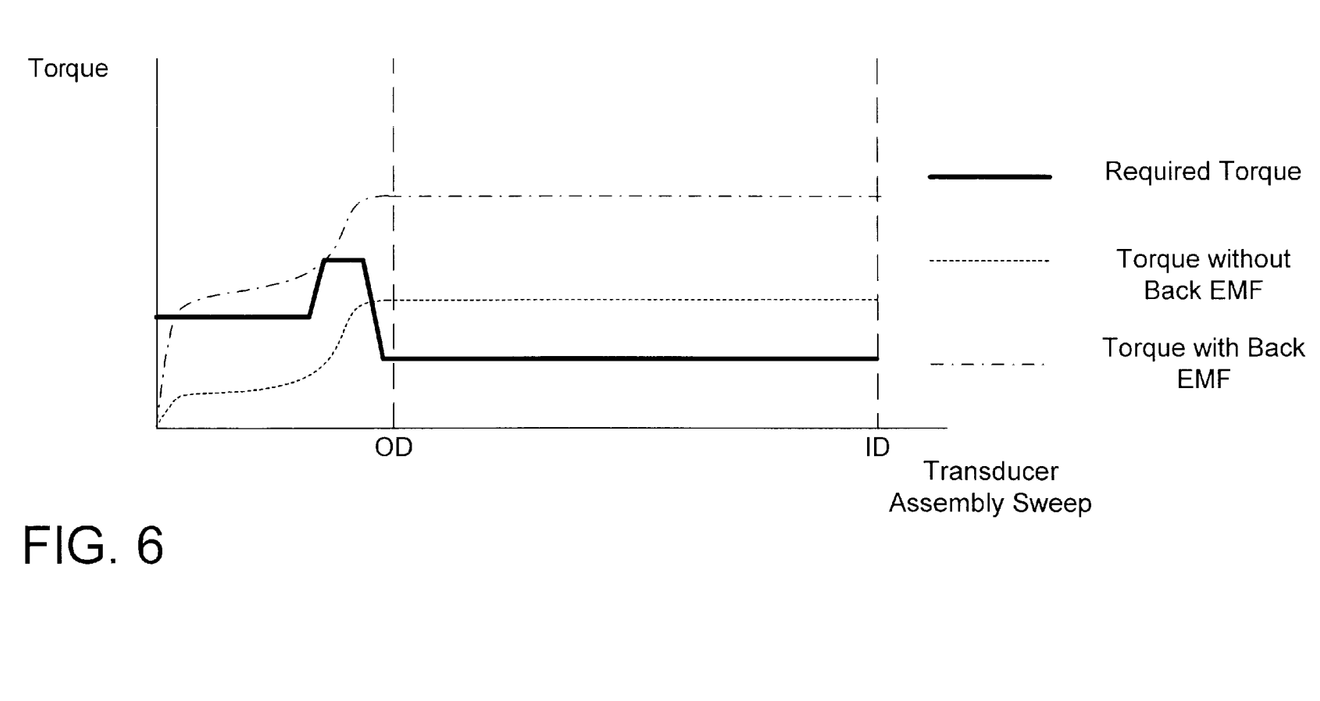
FIG. 6 depicts a graph of required and generated torque versus the transducer assembly sweep in a disc drive system having a modified VCM as shown in FIGS. 4 and 5 in an embodiment of the present invention.

FIG. 6 depicts a graph of required and generated torque versus the transducer assembly sweep in a disc drive system having a modified VCM as shown in FIGS. 4 and 5 in an embodiment of the present invention. In contrast to the generated torque graphs shown in FIG. 3, the amount of torque degradation in the ramp region is attenuated because the torque constant is elevated by the thinned and extended magnets. Therefore, the magnitude of additional toque required from the supplemental current is less than in the unmodified VCM in FIG. 2.

Figure 7:
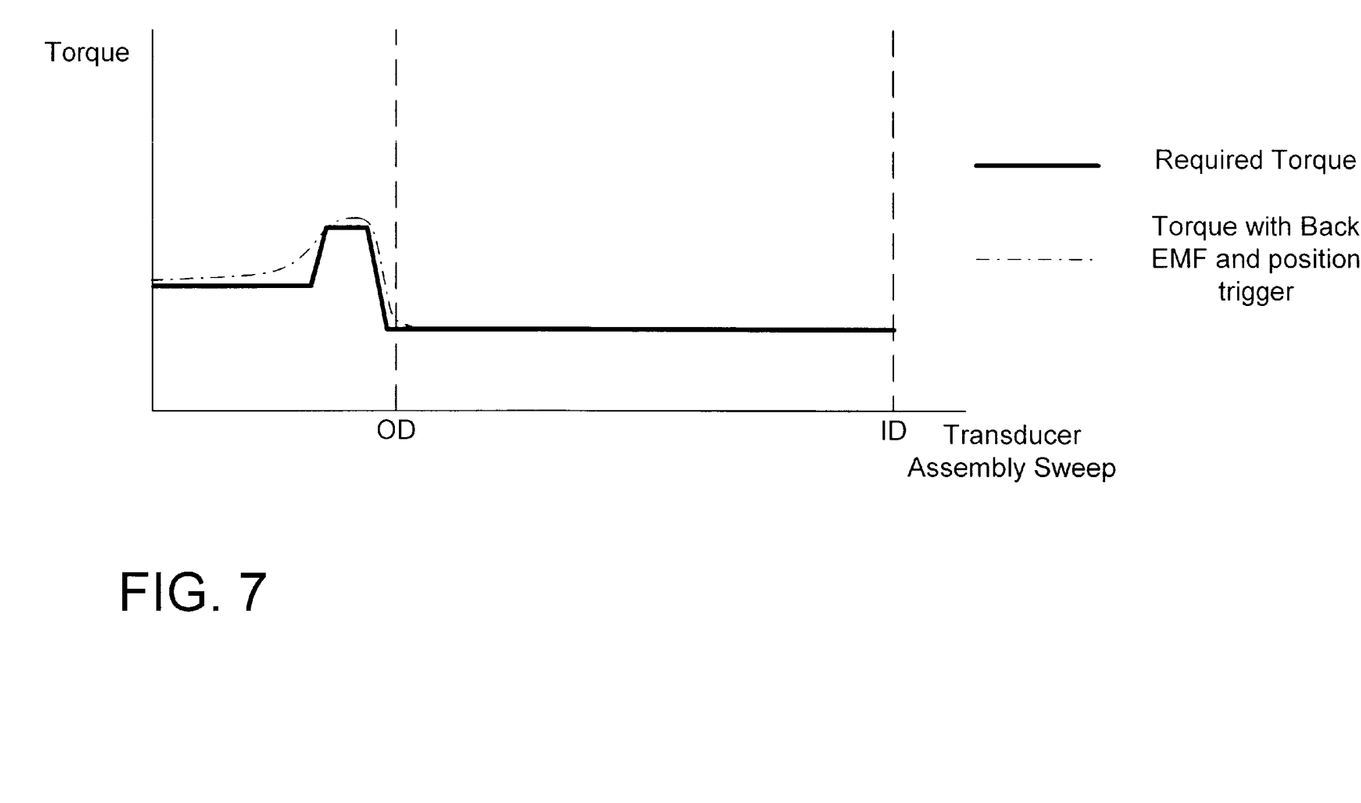
FIG. 7 depicts a graph of required and generated torque versus the transducer assembly sweep in a disc drive system having a modified VCM as shown in FIGS. 4 and 5 and a position detector/trigger in an embodiment of the present invention.

FIG. 7 depicts a graph of required and generated torque versus the transducer assembly sweep in a disc drive system having a modified VCM as shown in FIGS. 4 and 5 and a position detector/trigger in an embodiment of the present invention. In this configuration and responsive to a retract signal, a position detector detects the position of the transducer assembly relative to the disc surface. Preferably, the rotational angle of the actuator arm is determined about its common pivot structure 108 of FIG. 1 by means of a mechanical or optical switch activated by the pivot structure, the actuator arm or the transducer assembly. Alternatively, the position detector detects contact (e.g. electrical or mechanical contact) between the transducer assembly (or actuator arm) and the ramp. When the position of the transducer assembly reaches a position near the ramp, a trigger is issued to switch the back EMF to supplement the coil power supply, thereby providing increased torque only at the ramp region.

Figure 8:
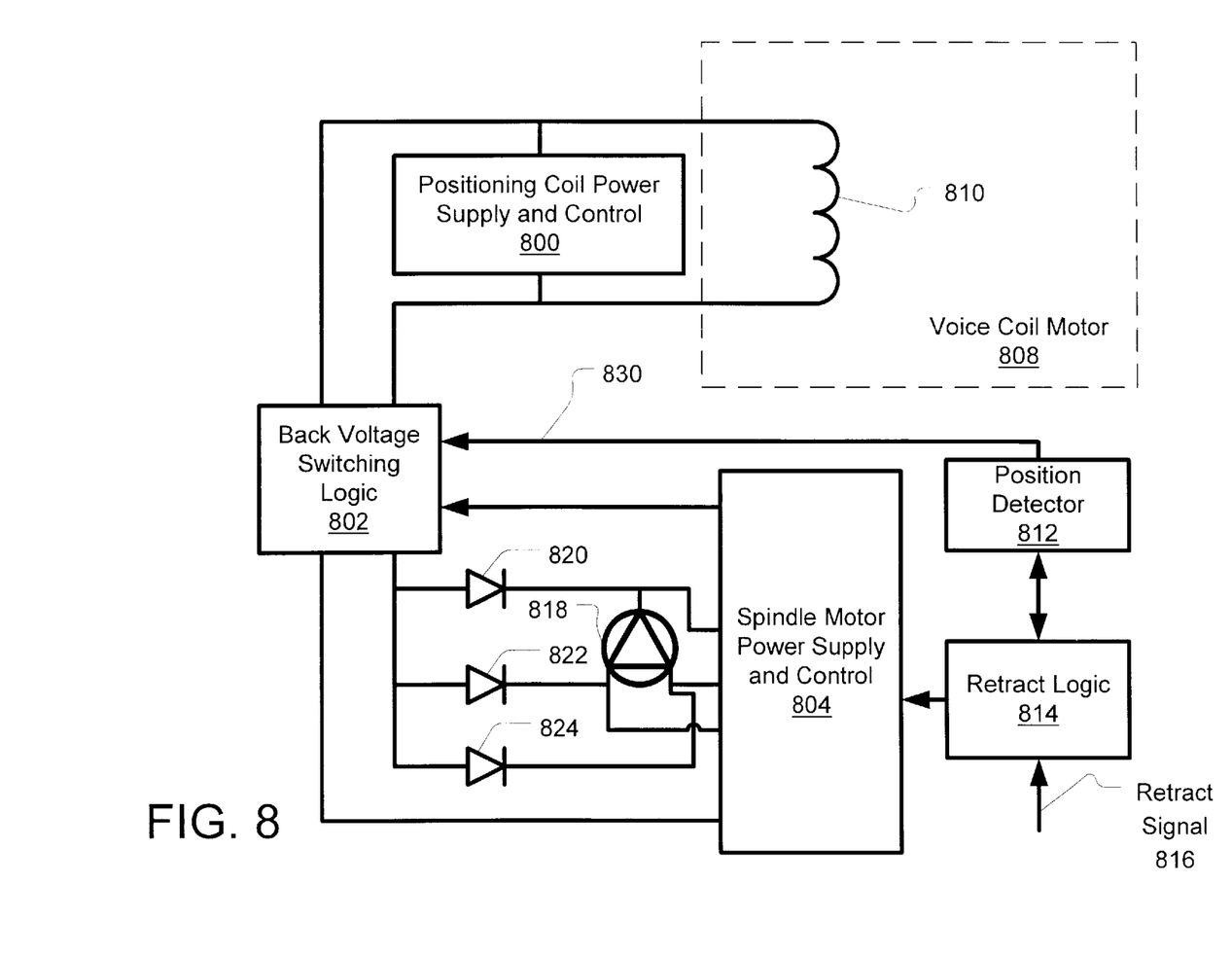
FIG. 8 depicts a block diagram of an unload control module in a disc drive system in an embodiment of the present invention.
Figure 9:
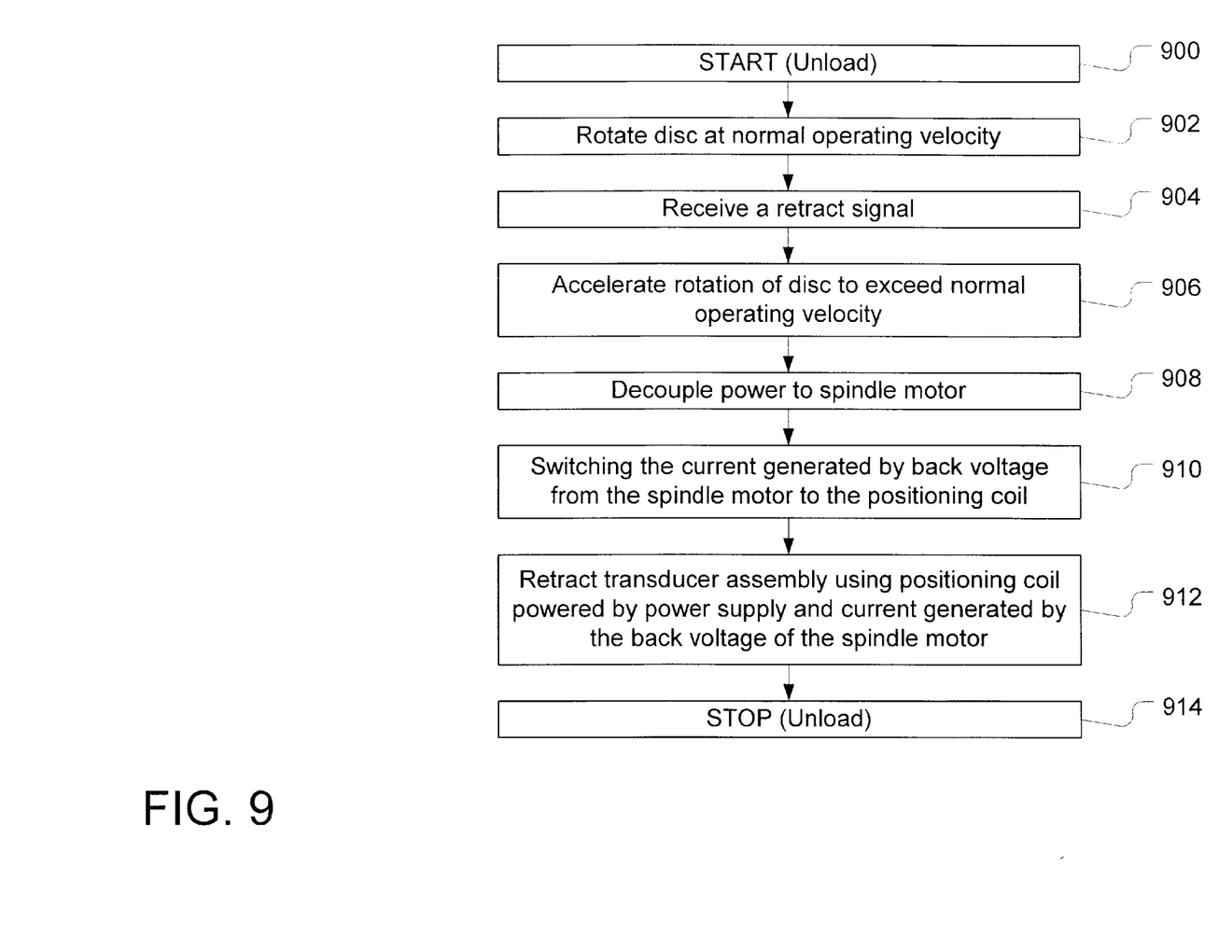
FIG. 9 depicts a flowchart of operations for retracting a transducer assembly in an embodiment of the present invention.

FIG. 8 depicts a block diagram of an unload control module in a disc drive system in an embodiment of the present invention. FIG. 9 depicts a flowchart of operations for retracting a transducer assembly in an embodiment of the present invention. For clarity, FIGS. 8 and 9 are described in tandem. During normal operation (i.e., not during a retract operation), a positioning coil power supply and control module 800 provides DC current to a positioning coil 810 in a VCM 808 to move an actuator arm relative to a disc surface. Also during normal operation, a spindle motor power supply and control module 804 provides DC current to the windings in a spindle motor to rotate a plurality of discs about a spindle. Accordingly, the control portion of the spindle motor module 804 couples the power supply portion to the spindle motor 818 to provide the current needed to rotated the disc. During this time, a back voltage switching logic module 802 isolates the positioning coil from the spindle motor 818. The power supply portions of modules 800 and 804 may be integrated into the same power supply in an alternative embodiment of the present invention.

When a retract signal 816 is received by a retract logic module 814, the unload control module initiates a retract process to unload the transducer assembly from the disc. The unload process in initiated in operation 900 of FIG. 9, at which time the disc or discs mounted on the spindle are spinning at a normal operating velocity and being powered by the spindle motor power supply and control module 804, as shown in operation 902. In operation 904, the retract logic module 814 receives a retract signal 816. Operation 906 accelerates the rotation of the disc to exceed the normal operating velocity by increasing the current to the spindle motor 818. A higher rotational velocity translates into increased back EMF, and therefore, increased current generated by the spindle motor. As a result, the spindle motor can generate significant current to supplement the positioning coil power supply current.

In operation 908, the spindle motor power supply and control module 804 decouples power from the spindle motor 818. Preferably, the decoupling operation 908 is accomplished by means of one or more transistors or other switches. In operation 910, the back voltage switching logic 802 couples back EMF from the spindle motor to provide current to the positioning coil 810. In the illustrated embodiment, the back voltage switching logic 802 represents a switched current source powered by the back EMF. The back EMF current source is switched in parallel with a current source in the positioning coil power supply and control module 800 to sum the current from the two sources. Preferably, the switching in operation 910 is performed by transistors or other known switching means.

The switching in operation 910 is preferably initiated by the spindle motor power supply and control module 804 after the power is decoupled from the spindle motor 818, but another switching trigger may be employed in an alternative embodiment of the present invention, including a timer, a trigger from the retract logic, and a voltage sensor detecting a positive voltage being generated by the spindle motor 818. The back EMF generated from the spindle motor is rectified by diodes 820, 822, and 824 or another known rectifying means to provide a DC current to the coil 810.

In operation 912, the VCM 808 retracts the transducer assembly using a servo algorithm controlling the magnitude, polarity, and duration of DC current provided to the coil 810. Preferably, the servo algorithm supplies current required to move the transducer assembly across the disc surface using a standard 5 volt or 3.3 volt voltage provided to the positioning coil, and does not accommodate the current required to surmount the ramp. However, in the retract operation in an embodiment of the present invention, the added current from the back EMF of the spindle motor 818 is sufficient to increase the total current delivered to the coil, independent of the servo algorithm, to ascend the ramp and unload the transducer assembly completely. Operation 914 terminates the unload process when the transducer assembly is fully retracted.

The position detector 812 is an optional component for providing a position-dependent trigger to the switching operation 910. Instead of initiating the operations 906–912 based merely on the retract signal, the timing of each operation may be tuned by means of a position-dependent trigger signal to optimize the initiation, duration and magnitude of the accelerated rotation of the spindle motor and the summing of the current components. For example, the spin up of the disc in operation 902 can be maintained until the transducer assembly is near to the ramp, at which point, the detector may trigger the retract logic module 814 (or the spindle motor power supply and control module 804) to decouple the power from the spindle motor 818. Alternatively, the position detector 812 can postpone the switching of the back voltage switching logic module 802 until the transducer assembly nears the ramp. In yet another embodiment, however, the unload logic can fully retract a transducer assembly without employing a position detector or position-based trigger means, as illustrated in FIG. 9.

In summary, a preferred embodiment disclosed herein is directed to a disc drive system and method for unloading a transducer assembly (such as 104) to a ramp (such as 116) positioned outside an outer diameter of a disc (such as 106) in a disc drive system including a spindle motor (such as 120) for rotating the disc (such as 106) and a positioning coil (such as 110) coupled to a power supply (such as 124) for moving the transducer assembly (such as 104) relative to the disc (such as 106). The disc (such as 106) is rotated at a first rotational velocity equaling a normal operational rotational velocity of the disc drive system. A retract signal (such as 816) is received.

The rotation of the disc (such as 106) is accelerated to a second rotational velocity that exceeds the normal operational rotational velocity of the disc drive system, responsive to the retract signal (such as 816).

A retract module (such as 814) causing the spindle motor (such as 120) to accelerate rotation of the disc (such as 106) to a second rotational velocity exceeding the normal operational velocity of the disc drive system, responsive to the retract signal (such as 816). Power is decoupled from the spindle motor (such as 120). The positioning coil (such as 110) is energized with output from the power supply (such as 124) to retract the transducer assembly (such as 104) to the ramp (such as 116), responsive to the retract signal (such as 816). A back voltage switching module (such as 802) diverts back voltage generated from the spindle motor (such as 120) to supplement the power provided to the positioning coil by the power supply (such as 124), responsive to a retract signal (such as 816). The positioning coil (such as 110) is energized with back voltage generated from the spindle motor (such as 120) to retract the transducer assembly (such as 104) to the ramp (such as 116).

In another embodiment, a position of the transducer assembly (such as 104) relative to the outer diameter of the disc (such as 106) is detected. A trigger signal (such as 830) is asserted when the position of the transducer assembly (such as 104) reaches a predetermined position relative to the outer diameter of the disc (such as 106).

In yet another embodiment, the positioning coil (such as 110) is disposed in a voice coil motor (such as 404) having a first magnet region corresponding to a position of the transducer assembly (such as 104) inside the outer diameter of the disc (such as 106) and a second magnet region corresponding to a position of the transducer assembly (such as 104) outside the outer diameter of the disc (such as 106), the first magnet region being thicker than the second magnet region.

Figure 10:
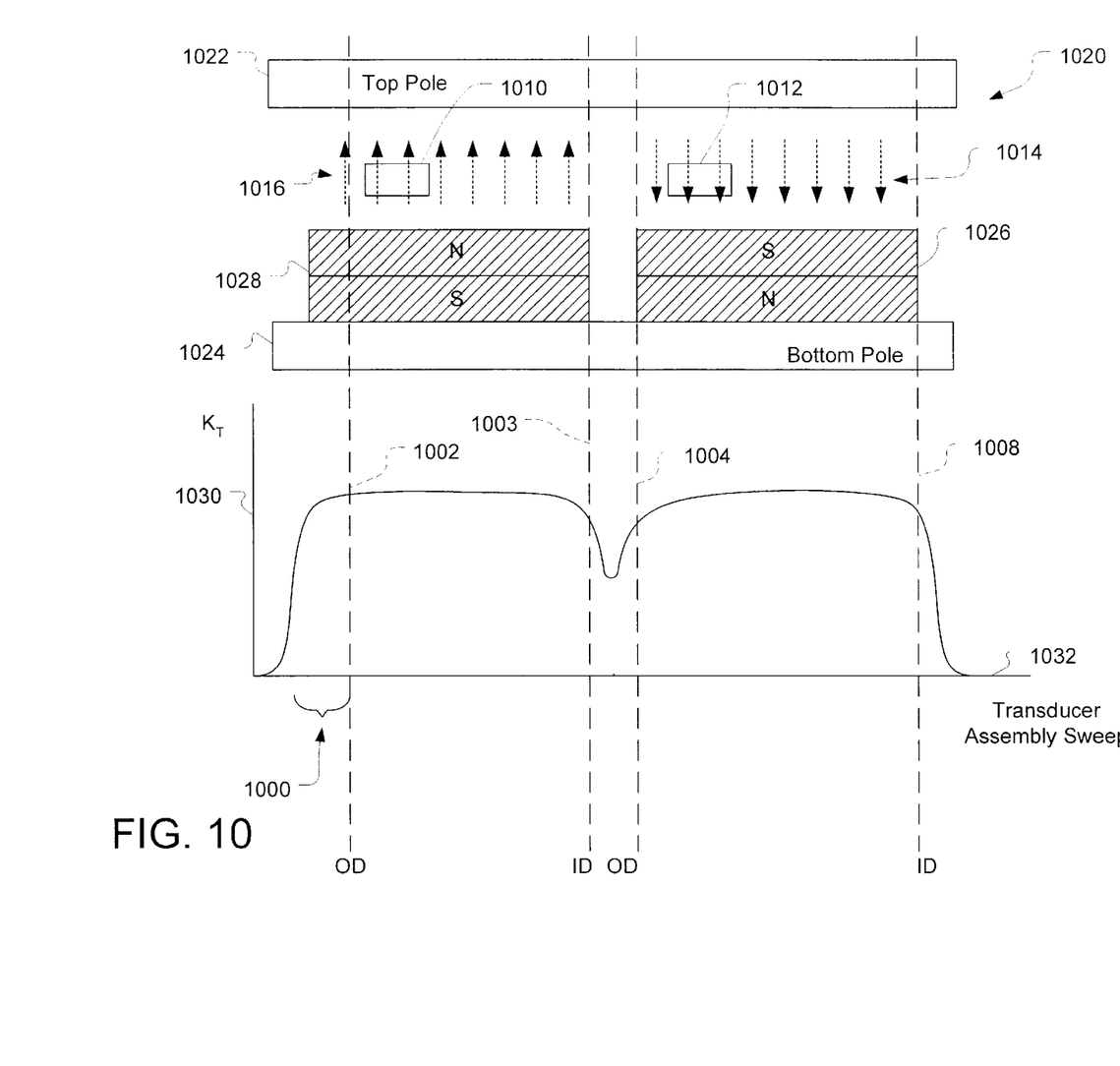
FIG. 10 depicts another alternative embodiment of a VCM configured to provide a tuned torque constant $K_T$.

FIG. 10 depicts another alternative embodiment of a VCM configured to provide a tuned torque constant $K_T$. Structure 1020 represents a portion of a VCM comprised of a top pole 1022, a bottom pole 1024, a right magnet 1026, a left magnet 1028, and coil arms 1010 and 1012. The left magnet 1028 and the right magnet 1026 are physically separated, and the left magnet 1028 extends in the unload region 1000. Accordingly, the effective $K_T$ applied in aggregation to the two coil arms is similar to that shown in FIG. 4. The arrows 1014 and 1016 indicate the direction of magnetic flux generated by magnets 1026 and 1028 and conducted by bottom pole 1024 and top pole 1022. When current is applied to coils 1010 and 1012, they are moved left or right in accordance with the well-known Lorenz relationship. As the coil arms 1010 and 1012 move relative to magnets 1028 and 1026 respectively, the transducer arm moves across the disc surface between the ID and OD. This relationship is indicated by dotted lines 1002, 1003, 1004 and 1008, which represent the corresponding positions of the transducer assembly relative to the position of the coils within the VCM. $K_T$ is the torque constant shown as axis 1030.

The decrease in $K_T$ at the extremes of the stationary magnets, which approximately correspond to the extremes of the transducer assembly sweep, is compensated by tuning the torque constant $K_T$ and the current I through the coil for certain sweep angles (shown by the transducer sweep axis 1032) because the torque T is also linearly proportional to the current I. Decreased manufacturing costs are an advantage to the configuration shown in FIG. 10.

The above specification, examples and data provide a complete description of the manufacture and use of the composition of the invention. It will be clear that the present invention is well adapted to attain the ends and the advantages mentioned as well as those inherent therein. While a presently preferred embodiment has been described for purposes of this disclosure, numerous changes may be made which will readily suggest themselves to those skilled in the art and which are encompassed in the spirit of the invention disclosed and as defined in the appended claims.

What is claimed is:

1. A method for unloading a transducer assembly to a ramp positioned outside an outer diameter of a disc in a disc drive system including a spindle motor for rotating the disc and a positioning coil coupled to a power supply for moving the transducer assembly relative to the disc, the method comprising:

(A) rotating the disc at a first rotational velocity equaling a normal operational rotational velocity of the disc drive system;

(B) receiving a retract signal;

(C) accelerating rotation of the disc to a second rotational velocity that exceeds the normal operational rotational velocity of the disc drive system, responsive to the retract signal;

(D) decoupling power provided to the spindle motor;

(E) energizing the positioning coil with output from the power supply to retract the transducer assembly to the ramp, responsive to the retract signal; and (F) energizing the positioning coil with back voltage generated from the spindle motor to retract the transducer assembly to the ramp, concurrently with operation (E).

2. The method of claim 1 further comprising:

(G) detecting a position of the transducer assembly relative to the outer diameter of the disc;

(H) asserting a trigger signal when the position of the transducer assembly reaches a predetermined position relative to the outer diameter of the disc; and (I) initiating operation (F) upon receipt of the trigger signal.

3. The method of claim 1 further comprising:

(G) disposing the positioning coil in a voice coil motor having a first magnet region corresponding to a position of the transducer assembly inside the outer diameter of the disc and a second magnet region corresponding to a position of the transducer assembly outside the outer diameter of the disc, the first magnet region being thicker than the second magnet region.

4. A disc drive system for unloading a transducer assembly from a disc having an inner diameter and an outer diameter, the system comprising:

a spindle motor rotating the disc at a first rotational velocity being a normal operational velocity of the disc drive system;

a spindlet motor control module removing power to the spindle motor;

a positioning coil coupled to a power supply moving the transducer assembly relative to the disc;

a back voltage switching module diverting back voltage generated from the spindle motor to supplement power provided to the positioning coil by the power supply, responsive to a retract signal; and a ramp positioned outside the outer diameter of the disc to which the positioning coil unloads the transducer assembly when powered by the power supply and the back voltage.

5. The system of claim 4 further comprising:

a retract module causing the spindle motor to accelerate rotation of the disc to a second rotational velocity exceeding the normal operational velocity of the disc drive system, responsive to the retract signal.

6. The system of claim 4 further comprising:

a position detector detecting a position of the transducer assembly relative to the outer diameter of the disc and triggering the retract module to accelerate the rotation of the disc when the transducer assembly reaches a predetermined position relative to the outer diameter of the disc.

7. The system of claim 4 further comprising:

a position detector detecting a position of the transducer assembly relative to the outer diameter of the disc and triggering the spindle motor control module to remove the power to the spindle motor, when the transducer assembly reaches a predetermined position relative to the outer diameter of the disc.

8. The system of claim 4 further comprising:

a position detector detecting a position of the transducer assembly relative to the outer diameter of the disc and triggering the back voltage switching module to divert the back voltage generated from the spindle motor to supplement the power provided to the positioning coil by the power supply.

9. The system of claim 4 further comprising:

a voice coil motor including the positioning coil, a first magnet region corresponding to a position of the transducer assembly inside the outer diameter of the disc, and a second magnet region corresponding to a position of the transducer assembly outside the outer diameter of the disc, the first magnet region being thicker than the second magnet region.

10. The system of claim 4 further comprising:

a voice coil motor including the positioning coil, a first magnet associated with a first coil arm of the positioning coil corresponding to a position of the transducer assembly ranging from the inner diameter of the disc to outside the outer diameter of the disc, and a second magnet associated with a second coil arm of the positioning coil corresponding to a position of the transducer assembly between the inner diameter and the outer diameter, the first and second magnets being physically separated by a non-magnet region corresponding to a position of the transducer assembly outside the outer diameter of the disc.

11. An apparatus for unloading a transducer assembly from a disc in a disc drive system including a spindle motors fr rotating the disc having an outer diameter, a positioning coil coupled to a power supply for moving the transducer assembly relative to the disc, and an actuator arm supporting the transducer assembly relative to the disc, the apparatus comprising:

a ramp positioned outside the outer diameter of the disc for receiving the transducer assembly and the actuator arm; and means for retracting the transducer assembly to the ramp.

12. A method for unloading a transducer assembly to a ramp positioned outside an outer diameter of a disc in a disc drive system including a spindle motor for rotating the disc and a positioning coil coupled to a power supply for moving the transducer assembly relative to the disc, the method comprising:

(A) rotating the disc at a first rotational velocity equaling a normal operational rotational velocity of the disc drive system;

(B) receiving a retract signal;

(C) accelerating rotation of the disc to a second rotational velocity that exceeds the normal operational rotational velocity of the disc drive system, responsive to the retract signal;

(D) energizing the positioning coil with output from the power supply to retract the transducer assembly to the ramp, responsive to the retract signal; and (E) energizing the positioning coil with back voltage generated from the spindle motor to retract the transducer assembly to the ramp, concurrently with operation (D).

13. A disc drive system for unloading a transducer assembly from a disc having an inner diameter and an outer diameter, the system comprising:

a spindle motor rotating the disc at a first rotational velocity being a normal operational velocity of the disc drive system;

a positioning coil coupled to a power supply moving the transducer assembly relative to the disc;

a back voltage switching module diverting back voltage generated from the spindle motor to supplement power provided to the positioning coil by the power supply, responsive to a retract signal; and a ramp positioned outside the outer diameter of the disc to which the positioning coil unloads the transducer assembly when powered by the power supply and the back voltage.

* * * * *